US012457259B2

United States Patent
Giladi et al.

(10) Patent No.: US 12,457,259 B2
(45) Date of Patent: Oct. 28, 2025

(54) METHODS, SYSTEMS, AND APPARATUSES TO MITIGATE SERVER-ASSOCIATED DELAYS IN CONTENT DELIVERY

(71) Applicant: Comcast Cable Communications, LLC, Philadelphia, PA (US)

(72) Inventors: Alexander Giladi, Centennial, CO (US); Alexander Balk, Centennial, CO (US); Ali C. Begen, Centennial, CO (US); Johnathon Benton, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/597,126

(22) Filed: Mar. 6, 2024

(65) Prior Publication Data
US 2025/0286921 A1 Sep. 11, 2025

(51) Int. Cl.
*H04L 65/752* (2022.01)
*H04L 43/0876* (2022.01)
*H04N 21/262* (2011.01)

(52) U.S. Cl.
CPC ........ *H04L 65/752* (2022.05); *H04L 43/0876* (2013.01); *H04N 21/262* (2013.01)

(58) Field of Classification Search
None
See application file for complete search history.

(56) References Cited

U.S. PATENT DOCUMENTS

| | | | |
|---|---|---|---|
| 2010/0333116 | A1 | 12/2010 | Prahlad |
| 2015/0271072 | A1 | 9/2015 | Moreman et al. |
| 2018/0316740 | A1 | 11/2018 | Stockhammer et al. |
| 2020/0314208 | A1* | 10/2020 | Meenan .................. H04L 67/56 |
| 2022/0038789 | A1* | 2/2022 | Giladi ..................... H04L 65/65 |
| 2023/0124840 | A1* | 4/2023 | Giladi ................ H04N 21/4334 386/241 |
| 2023/0275977 | A1* | 8/2023 | Begen ................. H04L 43/0852 709/217 |
| 2024/0089563 | A1* | 3/2024 | Giladi ................ H04N 21/8456 |
| 2024/0267598 | A1* | 8/2024 | Giladi .............. H04N 21/26258 |
| 2024/0284375 | A1* | 8/2024 | Khoshkholgh Dashtaki ............... H04W 72/21 |

OTHER PUBLICATIONS

Bentaleb, A. et al., "Common Media Client Data (CMCD): Initial Findings," Association for Computing Machinery, 2021, pp. 26-33.
Bentaleb, A. et al., "A Survey on Bitrate Adaptation Schemes for Streaming Media Over HTTP," IEEE Communications Surveys & Tutorials, 2019, pp. 562-585, vol. 21, issue 1.

(Continued)

Primary Examiner — June Sison
(74) Attorney, Agent, or Firm — Ballard Spahr LLP (57) ABSTRACT

Client devices in a content delivery network may send requests for content to upstream devices along with one or more parameters that indicate, as an example, client-device-related conditions or constraints, such as available buffer space or buffer starvation time. These parameters may be used by the upstream devices to prioritize content requests according to a prioritization schedule to ensure requested content is timely delivered to the appropriate client device(s) at the appropriate time to prevent playback failure, stalls, etc.

20 Claims, 6 Drawing Sheets

(56) References Cited

OTHER PUBLICATIONS

CTA Specification (CTA-5004), "Web Application Video Ecosystem—Common Media Client Data," Consumer Technology Association, 2020, 22 pgs.

Moglia, L, "Video Monitoring Dashboards with near real-time Edge Logs and CMCD KPIs," LinkedIn, 2021, 8 pgs.

Lee, D.H. et al., "Caching in HTTP Adaptive Streaming: Friend or Foe," Association for Computing Machinery, 2014, pp. 31-26.

MPEG, Workshop on session management and control for MPEG DASH, 2013, 2 pgs.

Lim, M. et al., "The Benefits of Server Hinting When DASHing or HLSing," Association for Computing Machinery, 2022, pp. 52-55.

Thomas, E. et al., "Applications and Deployments of Server and Network Assisted DASH (SAND)," IBC Conference 2016, 8 pgs.

Begen, A.C., "Road to Salvation: Streaming Clients and Content Delivery Networks Working Together," IEEE Communications Magazine, 2021, pp. 123-128.

Thomas, E. et al., "Enhancing MPEG DASH Performance via Server and Network Assistance," IBC Conference, 2015, 8 pgs.

Begen, A.C., "Manus Manum Lavat: Media Clients and Servers Cooperating with Common Media Client/Server Data," Association for Computing Machinery, 2021, pp. 82-84.

Olu, K. et al., "RFC 9218—Extensible Prioritization Scheme for HTTP," Internet Engineering Task Force, 2022.

\* cited by examiner

METHODS, SYSTEMS, AND APPARATUSES TO MITIGATE SERVER-ASSOCIATED DELAYS IN CONTENT DELIVERY

BACKGROUND

Content servers may cache content items to ensure timely delivery to requesting client devices. When a requested content item is not presently cached at the content server that receives the request, the content item may need to be retrieved from another content server, which may introduce delays in fulfilling the corresponding content request. These and other considerations are discussed herein.

SUMMARY

It is to be understood that both the following general description and the following detailed description are exemplary and explanatory only and are not restrictive. This summary is not intended to identify critical or essential features, but merely to summarize certain features and variations. Client devices in a content delivery network ("CDN") may send requests for content to upstream devices, such as content servers, along with one or more parameters that indicate client-device-related conditions or constraints. For example, a client device may indicate an available buffer space, a buffer starvation time, etc., via one or more parameters sent with a request.

Such parameters sent with content requests may be used by an upstream device(s) to prioritize responses to those content requests according to a prioritization schedule. As an example, when requested content is not available at an upstream device closest to an "edge" of the CDN relative to a requesting client device (e.g., when a "cache miss" occurs at the edge), the content may be requested from another upstream device closer to the "top" of the CDN, such as a mid-tier upstream device for example. However, doing so may introduce delays in fulfilling the content request, and such delays may be exacerbated when a same upstream device receives multiple content requests from multiple client devices that may each indicate differing conditions or constraints. To mitigate such delays, responses to content requests may be sent according to the prioritization schedule to ensure requested content is timely delivered to the appropriate client device(s) at the appropriate time (e.g., to prevent or mitigate playback failure, stalls, etc.) Other details and features will be described in the sections that follow.

BRIEF DESCRIPTION OF THE DRAWINGS

The accompanying drawings, which are incorporated in and constitute a part of this specification, together with the description, serve to explain the principles of the present methods and systems.

DETAILED DESCRIPTION

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to H.264/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC) or some other video file format, whether such format is presently known or developed in the future. The content items described herein may be electronic representations of music, spoken words, or other audio, which may be but is not limited to data files adhering to MPEG-1 audio, MPEG-2 audio, MPEG-2 and MPEG-4 advanced audio coding, MPEG-H, AC-3 (Dolby Digital), E-AC-3 (Dolby Digital Plus), AC-4, Dolby Atmos®, DTS®, and/or any other format configured to store electronic audio, whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio. This detailed description may refer to a given entity performing some action. It should be understood that this language may in some cases mean that a system (e.g., a computer) owned and/or controlled by the given entity is actually performing the action.

Figure 1:
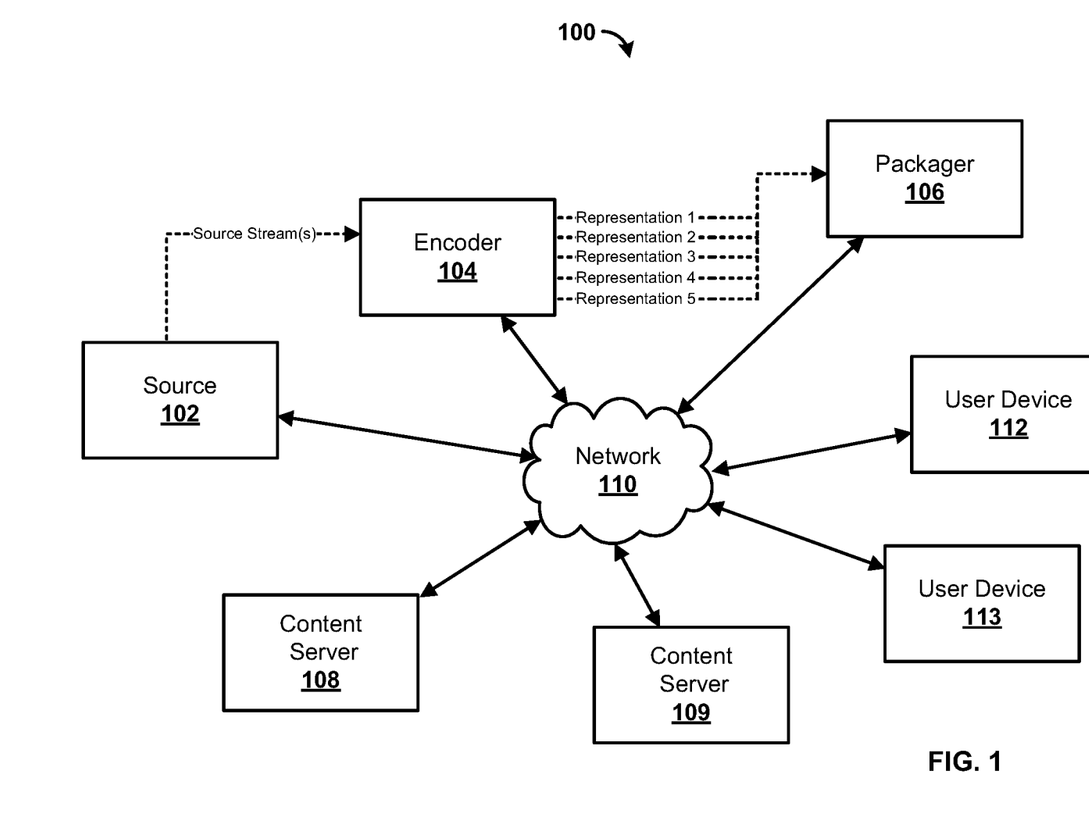
FIG. 1 shows an example system.

FIG. 1 shows an example system 100 for content delivery. The system 100 may comprise a plurality of computing devices/entities in communication via a network 110. The network 110 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 110 via a variety of transmission paths, including wireless paths (e.g., satellite paths, Wi-Fi paths, cellular paths, etc.) and terrestrial paths (e.g., wired paths, a direct feed source via a direct line, etc.). The network 110 may comprise public networks, private networks, wide area networks (e.g., Internet), local area networks, and/or the like. The network 110 may comprise a content access network, content distribution network, and/or the like. The network 110 may be configured to provide content from a variety of sources using a variety of network paths, protocols, devices, and/or the like. The content delivery network and/or content access network may be managed (e.g., deployed, serviced) by a content provider, a service provider, and/or the like. The network 110 may deliver content items from a source(s) to a user device(s).

The system 100 may comprise a source 102, such as a server or other computing device. The source 102 may receive source streams for a plurality of content items. The source streams may be live streams (e.g., a linear content stream) and/or video-on-demand (VOD) streams. The live streams may comprise, for example, low-latency ("LL") live streams. The source 102 may receive the source streams from an external server or device (e.g., a stream capture source, a data storage device, a media server, etc.). The source 102 may receive the source streams via a wired or wireless network connection, such as the network 110 or another network (not shown).

The source 102 may comprise a headend, a video-on-demand server, a cable modem termination system, and/or the like. The source 102 may provide content (e.g., video, audio, games, applications, data) and/or content items (e.g., video, streaming content, movies, shows/programs, etc.) to user devices. The source 102 may provide streaming media, such as live content, on-demand content (e.g., video-on-demand), content recordings, and/or the like. The source 102 may be managed by third-party content providers, service providers, online content providers, over-the-top content providers, and/or the like. A content item may be provided via a subscription, by individual item purchase or rental, and/or the like. The source 102 may be configured to provide content items via the network 110. Content items may be accessed by user devices via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The source 102 may provide uncompressed content items, such as raw video data, comprising one or more portions (e.g., frames/slices, groups of pictures (GOP), coding units (CU), coding tree units (CTU), etc.). It should be noted that although a single source 102 is shown in FIG. 1, this is not to be considered limiting. In accordance with the described techniques, the system 100 may comprise a plurality of sources 102, each of which may receive any number of source streams.

The system 100 may comprise an encoder 104, such as a video encoder, a content encoder, etc. The encoder 104 may be configured to encode one or more source streams received via the source 102 into a plurality of content items/streams at various bitrates (e.g., various representations/quality levels). For example, the encoder 104 may be configured to encode a source stream for a content item at varying bitrates for corresponding representations (e.g., versions/quality levels) of a content item for adaptive bitrate streaming. As shown in FIG. 1, the encoder 104 may encode a source stream into Representations 1-5. It is to be understood that the FIG. 1 shows five representations for explanation purposes only. The encoder 104 may be configured to encode a source stream into fewer or greater representations. Representation 1 may be associated with a first resolution (e.g., 480p) and/or a first bitrate (e.g., 2 Mbps). Representation 2 may be associated with a second resolution (e.g., 720p) and/or a second bitrate (e.g., 3.5 Mbps). Representation 3 may be associated with a third resolution (e.g., 1080p) and/or a third bitrate (e.g., 6 Mbps). Representation 4 may be associated with a fourth resolution (e.g., 4K) and/or a first bitrate (e.g., 18 Mbps). Representation 5 may be associated with a fifth resolution (e.g., 8K) and/or a fifth bitrate (e.g., 45 Mbps). Other example resolutions and/or bitrates are possible. Note that "Representation" is a term defined for MPEG DASH (ISO/IEC 23009-1), while Apple HTTP Live Streaming (IETF RFC 8216) (hereinafter, "HLS") defines the same concept as a "variant," and the present methods, systems, and apparatuses are not intended to be limited to DASH-based environments/use cases.

The system 100 may comprise a packager 106. The packager 106 may be configured to receive one or more content items/streams from the encoder 104. The packager 106 may be configured to prepare content items/streams for distribution. For example, the packager 106 may be configured to convert encoded content items/streams into a plurality of content fragments. The packager 106 may be configured to provide content items/streams according to adaptive bitrate streaming. For example, the packager 106 may be configured to convert encoded content items/streams at various representations into one or more adaptive bitrate streaming formats, such as Apple HTTP Live Streaming (HLS), Microsoft Smooth Streaming, Adobe HTTP Dynamic Streaming (HDS), MPEG DASH, any media streaming format based on the TCP or reliable UDP (e.g., Quick UDP Internet Connections, "QUIC") transport protocol, driven by client requests, and/or the like. The packager 106 may pre-package content items/streams and/or provide packaging in real-time as content items/streams are requested by user devices, such as a user device 112 and a user device 113. The user devices 112 and 113 may each be a content/media player, a set-top box, a client device, a smart device, a mobile device, a user device, etc. Though only two user devices are shown in FIG. 1, it is to be understood that the system 100 may comprise fewer or greater user devices.

The system 100 may comprise a content server 108. The content server 108 may be configured to receive requests for content, such as content items/streams. The content server 108 may identify a location of a requested content item and provide the content item—or a portion thereof—to a device requesting the content, such as the user device 112 and/or the user device 113. The content server 108 may be configured to provide a communication session with a requesting device, such as the user device 112, based on HTTP, FTP, or other protocols. The content server 108 may be one of a plurality of content servers distributed across the system 100. The content server 108 may be located in a region proximate to the user device 112. A request for a content stream/item from the user device 112 may be directed to the content server 108 (e.g., due to the location and/or network conditions). The content server 108 may be configured to deliver content streams/items to the user device 112 in a specific format requested by the user device 112. The content server 108 may be configured to provide the user device 112 with a manifest file (e.g., or other index file describing portions of the content) corresponding to a content stream/item. The content server 108 may be configured to provide streaming content (e.g., unicast, multicast) to the user device 112. The content server 108 may be configured to provide a file transfer and/or the like to the user device 112. The content server 108 may cache or otherwise store content (e.g., frequently requested content) to enable faster delivery of content items to users. The content server 108 may receive a request for a content item, such as a request for high-resolution video and/or the like. The content server 108 may receive the request for the content item from the user device 112. As further described herein, the content server 108 may be capable of sending (e.g., to the user device 112) one or more portions of the content item at varying bitrates (e.g., Representations 1-5).

The system 100 may comprise a content server 109 that provides similar functionality as the content server 108. The content server 109 may be "upstream" with respect to the content server 108 and/or the user devices 112,113. For example, the content server 109 may be "closer" in terms of network hops to an origin/source of the content relative to the content server 108. Additionally, or in the alternative, the content server 109 may comprise—or be a part of—a content origin(s), a mezzanine feed(s), etc. Though only two content servers are shown in FIG. 1, it is to be understood that the system 100 may comprise fewer or greater content servers.

The system 100 may be configured to mitigate server-associated delays in content delivery that cause latency, which may lead to re-buffering at the client devices (e.g., the user device 112 and/or 113). And cache misses at content servers at the edge (e.g., the content server 108 and/or 109) may add noticeable latency. A main reason for latency is that a request may need to be sent to another content server (e.g., a higher-level content server) or/and an origin server (e.g., the source 102) when a cache miss(es) occurs in order for the content server at the edge to respond to the corresponding content request(s). This situation puts client devices with low buffer levels at a higher risk, as cache miss latency may result in re-buffering (e.g., due to empty buffer) or a shift to a lower-quality representation (e.g., if the buffer levels are low but sustainably so). Given increased probability of cache misses, the problem is more pronounced when requested content has low concurrency (e.g., a relatively small number of client devices are requesting the content) and/or when the content server at the edge does not serve a large number of clients.

The system 100 may mitigate such delays/latency by processing content requests according to a prioritization schedule. For example, the system 100 may process content requests according to a prioritization schedule that may be based on the prioritization scheme defined by the IETF in RFC 9218 (e.g., an HTTP/2 or HTTP/3-based prioritization scheme). However, it is to be understood that the prioritization scheme defined by the IETF in RFC 9218 is provided herein as merely one example of many examples the system 100 may use.

The prioritization scheme may be associated with one or more prioritization parameters. For example, the system 100 may use a first prioritization parameter, u (referred to herein as an "urgency parameter"), and a second prioritization parameter, i (referred to herein as an "incremental parameter"). The prioritization parameters may be communicated by client devices to content servers. For example, the prioritization parameters may be communicated by client devices to content servers via an HTTP Priority header field and/or a PRIORITY_UPDATE frame. The HTTP Priority header field and/or the PRIORITY_UPDATE frame may be carried within (e.g., sent via) an HTTP/3 Control Stream. For example, a request indicative of the urgency parameter having a value of u=3 may represent an urgency level of "3" (e.g., on a scale from 0-7, with 0 being the highest urgency level), and a request indicative of the incremental parameter i being "yes" or "true" may indicate the response to be provided may be sent incrementally (e.g., the response may be sent in parts). Examples of incremental responses (e.g., responses that may be sent in parts) include streaming content/media, like videos or audio (e.g., streamed in chunks, allowing for continuous playback as more data is received). Non-incremental responses, on the other hand, may be those that must be fully received before they may be used, executed, parsed, etc. Examples of non-incremental responses may include manifest files, configuration files, etc. (e.g., data, files, etc., that generally must be fully downloaded and available before they may be opened, parsed, or executed).

Each of the content servers 108, 109 may communicate with another content server(s) (e.g., a higher-level content server(s)) and/or an origin server(s) (e.g., the source 102) when a cache miss(es) occurs. And the corresponding content request(s) associated with the cache miss(es) may be multiplexed on a same session or connection or stream with the other content server(s). For example, the corresponding content request(s) may be sent from the content server experiencing the cache miss(es) to the other content server (e.g., a higher-level content server) via a same session or connection or stream between the two servers. For example, the corresponding content request(s) associated with the cache miss(es) may be multiplexed on (e.g., sent via) a same HTTP/2 connection/session/stream, a same HTTP/3 connection/session/stream, a same Quick UDP Internet Connection ("QUIC") connection/session/stream, and/or the like rather than via separate connections/sessions. In other words, multiple content requests may be sent from a first content server(s) (e.g., a lower-level content server(s)) to another content server(s) (e.g., a higher-level content server(s)) and/or an origin server(s) via a same session, connection, etc., versus using a separate connection/session/stream per request And, as further described herein, the other content server(s) and/or the origin server(s) may respond to a multiplexed content request(s) based on (e.g., according to) a prioritization schedule, which itself may be based on client-device-related constraints or conditions indicated by the requesting client device(s).

For purposes of explanation, the description herein is written as communication between a content server at the edge (e.g., the content server 108) and a higher-level content server (e.g., the source 102 and/or the content server 109); however, the description herein may apply equally to any two content servers having a parent-child relationship and logically (e.g., in terms of a network, such as the network 110) between a client device(s) and an origin server (e.g., a content source, such as the source 102).

As one example, the user devices 112,113 may be geographically closest to (and/or a least number of network hops away from) the content server 108 versus the content server 109 (e.g., the content server 108 may be at the "edge" of the system 100 relative to the user devices 112,113). The content server 108 may receive separate content requests, which may or may not be associated with a same portion of content or content item, from the user devices 112,113. However, the requested content may not be present in cache/storage associated with the content server 108 (e.g., the content server 108 may experience a "cache miss" with respect to the content requests). The content server 108 may be at a "lower-level" in the system's 100 network hierarchy (e.g., at a mid-tier) with respect to the content server 109, which may be—in at least this example—at a "higher-level" than the content server 108 (e.g., at a higher tier). In response to the content server 108 determining that the requested content is not present in cache/storage (e.g., in response to the content server 108 experiencing a "cache miss"), the content server 108 may retrieve/request the requested content from, in at least this example, the content server 109. However, instead of sending separate requests to the content server 109 that would each use a separate connection/session/stream, the content server 108 may send a multiplexed request to the content server 109 via a same session or connection or stream between the two servers. The content server 108 may send the multiplexed request to the content server 109 by sending separate requests (e.g., based on each request received from the user devices 112, 113) on/via a same session or connection or stream with the content server 109. For example, the corresponding content request(s) may be sent from the content server 108 to the content server 109 via a same HTTP/2 connection/session/stream, a same HTTP/3 connection/session/stream, a same Quick UDP Internet Connection ("QUIC") connection/session/stream, and/or the like, rather than via separate connections/sessions/streams.

As described herein, the system 100 may process content requests according to a prioritization schedule, which may indicate values for a first prioritization parameter, u (the "urgency parameter"), and a second prioritization parameter, i (the "incremental parameter") for each associated content request. The system 100 may comprise an upstream request scheduler (hereinafter, a "scheduler", not shown). The scheduler may modify values of the aforementioned prioritization parameters indicated by content requests (e.g., the urgency parameter and the incremental parameter). For example, the scheduler may modify a request indicative of an urgency parameter having a value of u=3 (an urgency level of "3") to a greater or lesser value, depending on various factors discussed herein. The scheduler may maintain a prioritization schedule to track each content request received and modifications that may be made to the prioritization parameters. The prioritization schedule may comprise, for example, a priority queue, a table, a hash table, a linked list, a custom data structure, a combination thereof, and/or the like.

The scheduler and/or the prioritization schedule may be resident at each of the content servers 108 and 109 of the system 100. Additionally, or in the alternative, the scheduler and/or the prioritization schedule may be resident at another device within the system 100 (not shown) that is in communication with each of the content servers 108 and 109. The scheduler may assign (e.g., modify/reassign) higher priorities according to high-priority client devices (e.g., the user device 112 and/or 113), high-priority content, higher-priority request types, a combination thereof, and/or the like. There may also be classes of client devices deemed high priority due to business rules (e.g., content output at certain establishments, such as those showing sporting events, should not encounter stalls or delays for business reasons). Additionally, a same session (e.g., an HTTP/2 or HTTP/3 connection/session, a Quick UDP Internet Connections ("QUIC") connection/session, etc.) may be used for prefetching content resources that are highly likely to be requested, especially if associated with high-priority content, such as initialization segments, manifest files, etc.

A high-priority client device (e.g., the user device 112 and/or 113) may be a "struggling client device" at risk of quality degradation or re-buffering due to low buffer level. For example, the client device may indicate a low buffer condition to the content server using the Common Media Client Data specification as defined by the Consumer Technology Association; however, other examples for communicating the low buffer condition are possible as well. A high-priority client device may also be a client device outputting content at very low latency and/or at slower playback speeds in order to avoid stalling. For example, a client device may comprise a playback buffer for storing content that is to be output (e.g., played, displayed, etc.) at a later time, and the content request may comprise an indication of a status of the playback buffer (a "buffer status").

A client device's buffer status may be indicative of one or more of: a buffer length, a buffer size, an amount of time, an amount of memory, a combination thereof, and/or the like. Additionally, or in the alternative, the buffer status may comprise and/or indicate a buffer starvation time and/or a buffer length parameter. The buffer length parameter may represent and/or indicate a size of content stored in the buffer (e.g., memory size) and/or a length of content stored in the buffer (e.g., an amount of time). The content server (e.g., the content server 108 and/or 109) may determine the buffer starvation time based on the buffer status indicated. For example, the content server may determine the buffer starvation time based on the buffer length parameter, and the buffer starvation time may comprise an amount of time that the client device may output one or more portions of the content that are presently stored in the playback buffer (e.g., an amount of time until the playback buffer becomes depleted). The content server that receives the corresponding content request from the requesting client device may prioritize the request in correlation with a shallowness of the client device's buffer (e.g., based on the buffer status). For example, the content server may prioritize the request in correlation with the shallowness of the client device's buffer when the client device's buffer is shorter than some threshold, T (e.g., a period of time, amount of time, etc.), Examples of content that the scheduler may determine to be high-priority content may include low-latency linear content or/and high-concurrency content likely to generate a large number of requests for the same content segment(s) from multiple client devices. High-priority request types may as content requests where the requested content has a high impact on quality of experience (e.g., content quality upon playback/output). For example, a content request may be assigned a high-priority request type by the scheduler when the requested content is a manifest file (e.g., a DASH MPD) and/or an initialization segment(s), since both are smaller than content segments and both are essential for starting video playback.

As another example, a higher priority may be assigned to a content request when the requested content is a lowest-rate/lowest-quality version available and/or the requested content is audio content (e.g., an audio track(s)). The lowest-rate/lowest-quality version is typically requested by either struggling client devices (e.g., struggling to start or continue playback) and/or by client devices that are building-up their buffer to start playback. Audio content, such as one or more audio tracks, may be assigned a higher priority because a struggling client device may be able to at least continue audio playback even when corresponding video playback stalls or fails. Additionally, if scalable coding is used, enhancement layer segments may be prioritized lower.

In low-latency live streaming, a single content segment may comprise a small number of frames (e.g., 100 milliseconds worth of frames, or even a single frame), and such content segments are referred to as "partial segments," as they are not necessarily independently playable and are solely intended to reduce transmission delay. For example, if the requested content is a partial segment that does not carry any independently-playable frames (e.g., "IDR" frames, etc.), then the corresponding content request may be assigned a lower priority by the scheduler, while partial segments with independently-playable frames may be assigned a higher priority by the scheduler. When low-delay streaming is being used, special representations intended for fast start-up (e.g., as defined in SCTE 214-6 or DASH-IF IOP) may also be prioritized by the scheduler.

The scheduler, which again may be resident at the content server 108 and/or 109, may further reprioritize a given content request based on its deadline. The deadline may be computed given data points such as buffer duration at the client device (e.g., the user device 112 and/or 113), round trip time, link throughput, a size (real or estimated) of the response, a combination thereof, and/or the like. In this way, content requests that are "in flight" (e.g., in-process) may be prioritized higher as they get closer to their deadline. This requires the scheduler to periodically re-assess the progress of the ongoing content requests.

In some examples, a struggling client device may cancel a content request for a content segment at a high or a medium bitrate/quality level and subsequently send a content request for the same content segment at a lower bitrate/quality level. In such examples, the scheduler and/or the corresponding content server may not cancel the request for the content segment at the high or the medium bitrate/quality level but may rather deprioritize it while still fulfilling the subsequently-sent content request for the same content segment at the lower bitrate/quality level.

In some examples, the content request may be for a manifest file (e.g., a DASH MPD), and the content server that receives the request may determine a cache miss (e.g., the manifest file is not available at the content server), which may cause the content request to be forwarded to an origin server (e.g., content source). In such examples, the scheduler and/or the origin server may add an additional Early Hint response (e.g., an HTTP status of 103) listing URLs for content resources that are likely to be requested next. For example, the URLs listed may be associated with an initialization segment associated with the requested manifest file, an XLink response(s), a subset of content segments associated with the requested manifest file that are either more likely to be requested next and/or are the lowest-rate/lowest-quality versions of those content segments (e.g., those that may be provided in order to avoid playback stalling or failure), a combination thereof, and/or the like. The scheduler and/or the origin server may then determine which of the aforementioned content resources may result in a cache miss if requested by the client device and may further request those content resources, or a subset thereof, based on the content server's possible knowledge of bitrate(s)/quality level(s) requested.

In examples where low-latency live streaming is being used, the content server may request a manifest file or/and a content segment(s) that is not yet available (e.g., not yet generated, packaged, and/or encoded). The content server may request the manifest file or/and the content segment(s) that is not yet available in response to the corresponding client device sending a "blocking request" as defined in Apple Low Latency-HLS and/or a miscalculated timing (e.g., via CMCD to indicate a next requested object), for example. In this case, the request may be made with low priority and the scheduler may reprioritize fulfillment of the request once the requested object, or a portion thereof, becomes available.

The scheduler may receive indications from client devices related to network congestion, such as "explicit congestion notifications" (ECN) indicated by content requests. Additionally, or in the alternative, the scheduler, which may be resident at a content server closest to the "edge" (e.g., closest to the requesting client device), may respond to duress signals sent by another content server (e.g. via CMSD). For example, the scheduler may cause prefetching requests to be paused or/and dropped. As another example, the scheduler may deprioritize requests for content segments at a highest-available bitrate/quality level, especially for low-priority content. For example, client devices streaming content at 4K resolution may be downgraded to 1440p and later to 1080p. In such examples, the scheduler and/or the content server closest to the edge may indicate a maximum allowed bandwidth and/or the duress signals to the corresponding client device (e.g., using the Common Media Server Data specification, as defined by the Consumer Technology Association). Additionally, or in the alternative, if layered coding such as LC-EVC, S-HEVC, or SVC is used, enhancement layer segments may be deprioritized or dropped.

In some examples, there may be dependencies, either explicit or implicit, between content requests (e.g., requests for portions of the same content item). For example, when a content request received from a client device (e.g., the user device 112 and/or 113), the request may have an associated "deadline" that may represent when the client device "needs" the requested content/portion, such as to avoid playback stalls when an associated buffer is almost depleted. If such a deadline is missed for a requested base layer segment when scalable coding is used, for example, a deadline for an enhancement layer segment may be disregarded, since use of the enhancement layer segment is dependent upon availability of the corresponding base layer segment. Similarly, if a requested low-latency (LL) partial segment/portion of content carrying an independently-playable frame(s) failed its corresponding "deadline," then any associated deadline(s) for any following portion(s) of the content that depends on the independently-playable frame(s) for decoding may be extended. These examples, as well as other possible examples for mitigating server-associated delays, are further illustrated in the description herein for example workflows 200A and 200B shown in FIGS. 2A and 2B, as well as methods 400-600 shown in FIGS. 4-6 and further described herein.

Figure 2A:
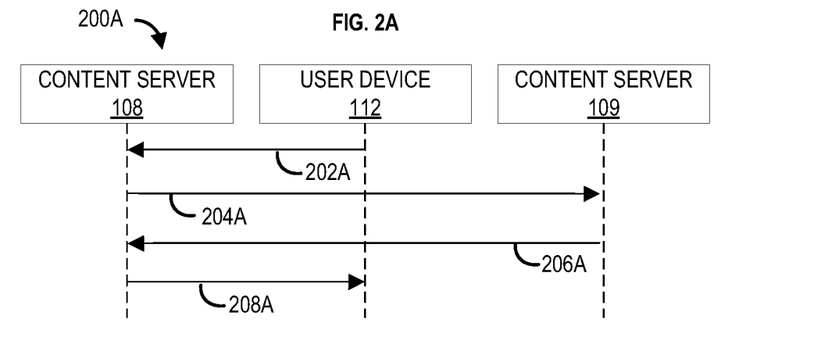
FIG. 2A shows an example workflow for content delivery.

As an example, FIG. 2A shows the example workflow 200A, which may be implemented by the system 100 when a cache miss occurs. At step 202A, the user device 112 may send a request for content. The user device 112 may send the request to the content server 108 directly. Additionally, or in the alternative, the request may be sent from the user device 112 to one or more intermediary devices/components of the system 100 (e.g., servers, caches, etc.—not shown in FIG. 1), which may send (e.g., route, forward, etc.) the request to the content server 108. The request may comprise any suitable message for requesting the content, such as a request for a segment of the content, a chunk of the content, a manifest (or portion thereof) for the content, a combination thereof, and/or the like.

The content server 108 may receive the request. Based on the request, the content server 108 may determine whether the content is available locally. For example, the content server 108 may determine whether the corresponding segment, chunk, and/or manifest for the content is available at a cache(s) of the content server 108 or at a storage repository readily accessible by the content server 108 (e.g., within a same network, a same server group, etc.). The content server 108 may determine that the content requested by the user device 112 is not locally available. Such a scenario may be referred to herein as a "cache miss." When the content server 108 determines the cache miss (e.g., determines the unavailability of the content locally), the content server 108 may request and/or retrieve the content from another device/component of the system 100. The content server 108 may determine which server, cache, or storage repository of the system 100 has the content available based on caching records, caching rules, caching schedules, load balancing rules, content delivery rules, a combination thereof, and/or the like. For example, the content server 108 may determine that the content is available—or the content server 108 may simply inquire whether the content is available—at the content server 109.

At step 204A, the content server 108 may request and/or retrieve the content from the content server 109. For example, the content server 108 may request and/or retrieve the corresponding segment, chunk, and/or manifest (or portion thereof) for the content from the content server 109. The content server 108 may send a request for the content to the content server 109 directly or via one or more intermediary devices/components of the system 100 (e.g., servers, caches, etc.—not shown in FIG. 1), which may send (e.g., route, forward, etc.) the request to the content server 109. The request sent to the content server 109 at step 204A may be a multiplexed request associated with a plurality of content requests (e.g., received from the user device 112, the user device 113, and/or other user/client devices not shown). For example, the content server 108 may send the multiplexed request to the content server 109 by sending separate requests (e.g., based on each content request received) on/via a same session or connection or stream with the content server 109, such as a same HTTP/2 connection/session/stream, a same HTTP/3 connection/session/stream, a same Quick UDP Internet Connection ("QUIC") connection/session/stream, and/or the like, rather than via separate connections/sessions/streams. The content server 109 may receive the multiplexed request inasmuch the content server 109 may receive each of the separate requests sent by the content server 108 via the same HTTP/3 connection/session/stream, the same QUIC connection/session/stream, and/or the like, rather than via separate connections/sessions/streams.

The multiplexed request may be indicative of, and/or comprise, the prioritization schedule described herein. For example, each content request of the plurality of content requests may indicate at least one prioritization parameter associated with a corresponding user/client device that sent the corresponding content request to the content server 108, and the prioritization schedule may indicate the at least one prioritization parameter for each content request of the plurality of content requests. The content server 109 may process each of the content requests according to the prioritization schedule. For example, a content request associated with the multiplexed request may be processed before another content request that was also received as part of the multiplexed request if the at least one prioritization parameter (e.g., urgency parameter) for the content request indicates a buffer starvation time and/or a buffer length parameter that is less than a buffer starvation time and/or a buffer length parameter indicated by the at least one prioritization parameter (e.g., urgency parameter) for the other content request. Other examples are possible as well (e.g., based on an incremental parameter, etc.) At step 206A, the content server 109 may send the content to the content server 108. For example, the content server 109 may send the corresponding segment, chunk, and/or manifest (or portion thereof) for the content to the content server 108. The content server 108 may receive the content from the content server 109. At step 208A, the content server 108 may send the content to the user device 112.

Figure 2B:
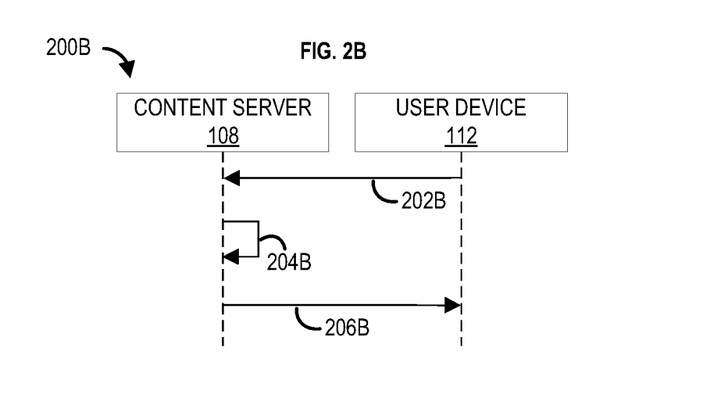
FIG. 2B shows an example workflow for content delivery.

FIG. 2B shows the example workflow 200B. The workflow 200B may be implemented by the system 100 as part of the workflow 200A or it may be implemented separately. For example, the workflow 200B may be implemented by the system 100 when requested content is not immediately provided to a requesting device/component (e.g., a client/user device) due to the prioritization schedule of the system 100 discussed herein.

At step 202B, the user device 112 may send a request for content. The user device 112 may send the request to the content server 108 directly. Additionally, or in the alternative, the request may be sent from the user device 112 to one or more intermediary devices/components of the system 100 (e.g., servers, caches, etc.—not shown in FIG. 1), which may send (e.g., route, forward, etc.) the request to the content server 108. The request may comprise any suitable message for requesting the content, such as a request for a segment of the content, a chunk of the content, a manifest (or portion thereof) for the content, a combination thereof, and/or the like. The user device 112 may comprise a playback buffer for storing content that is to be output (e.g., played, displayed, etc.) at a later time, and the request sent by the user device 112 may comprise an indication of a status of the playback buffer. For example, the indication of the status of the playback buffer may be communicated by the user device 112 via an urgency parameter included with the request, as described herein. The status of the playback buffer may comprise and/or indicate (e.g., via the urgency parameter) a buffer starvation and/or a buffer length parameter. The buffer length parameter may represent and/or indicate a size of content stored in the buffer (e.g., memory size) and/or a length of content stored in the buffer (e.g., an amount of time). The prioritization schedule may be implemented by the system 100 to prevent the buffer becoming depleted and causing a stall in content output. For example, the user device 112 may encounter a stall when a next portion(s) of content being output is not received in a timely manner (e.g., prior to content in the buffer being output).

The content server 108 may determine a buffer starvation time based on the status of the playback buffer (e.g., based on the urgency parameter). For example, the content server 108 may determine the buffer starvation time based on the buffer length parameter indicated by the urgency parameter sent with the request. The buffer starvation time may comprise an amount of time that the user device 112 may output one or more portions of the content that are presently stored in the playback buffer (e.g., an amount of time until the playback buffer becomes depleted).

At step 204B, the content server 108 (e.g., via the scheduler) may determine that the request sent by the user device 112 is to be placed in a queue of requests (e.g., not immediately fulfilled). The content server 108 may place the request in the queue based on the prioritization schedule. For example, the request may indicate the prioritization parameter (e.g., u=3) having an urgency level of "3", and the content server 108 may modify/reassign the urgency level indicated by the request. For example, the content server 108 may determine that the request received by the user device 112 at step 202B is to be processed after another request sent by the user device 113 (not shown). The other request sent by the user device 113 may comprise a prioritization parameter (e.g., an urgency parameter) indicating a status of a playback buffer of the user device 113, such as a corresponding buffer length parameter. The prioritization parameter sent by the user device 113 may indicate a buffer starvation time for the user device 113 that is smaller (e.g., earlier in time) than the buffer starvation time for the user device 112. The scheduler may cause the content server 108 to prioritize the request sent by the user device 113 over the request sent by the user device 112. For example, the content server 108 may cause the urgency level indicated by the request sent by the user device 113 to be modified to a lower/more urgent level and/or placed ahead in the queue, etc., such that the request sent by the user device 113 may be processed before the request sent by the user device 112 is processed.

At step 206B, the content server 108 (e.g., via the scheduler) may process the request sent by the user device 112 (e.g., after processing the request sent by the user device 113). It is to be understood that the scheduler may cause the content server 108 (and/or the content server 109) to prioritize one request over another for other reasons as well. For example, the scheduler may cause the content server 108 (and/or the content server 109) to prioritize a request based on content type, request type, client type, content popularity, device type, device class, service/subscriber type or level, a combination thereof, and/or the like.

Figure 3:
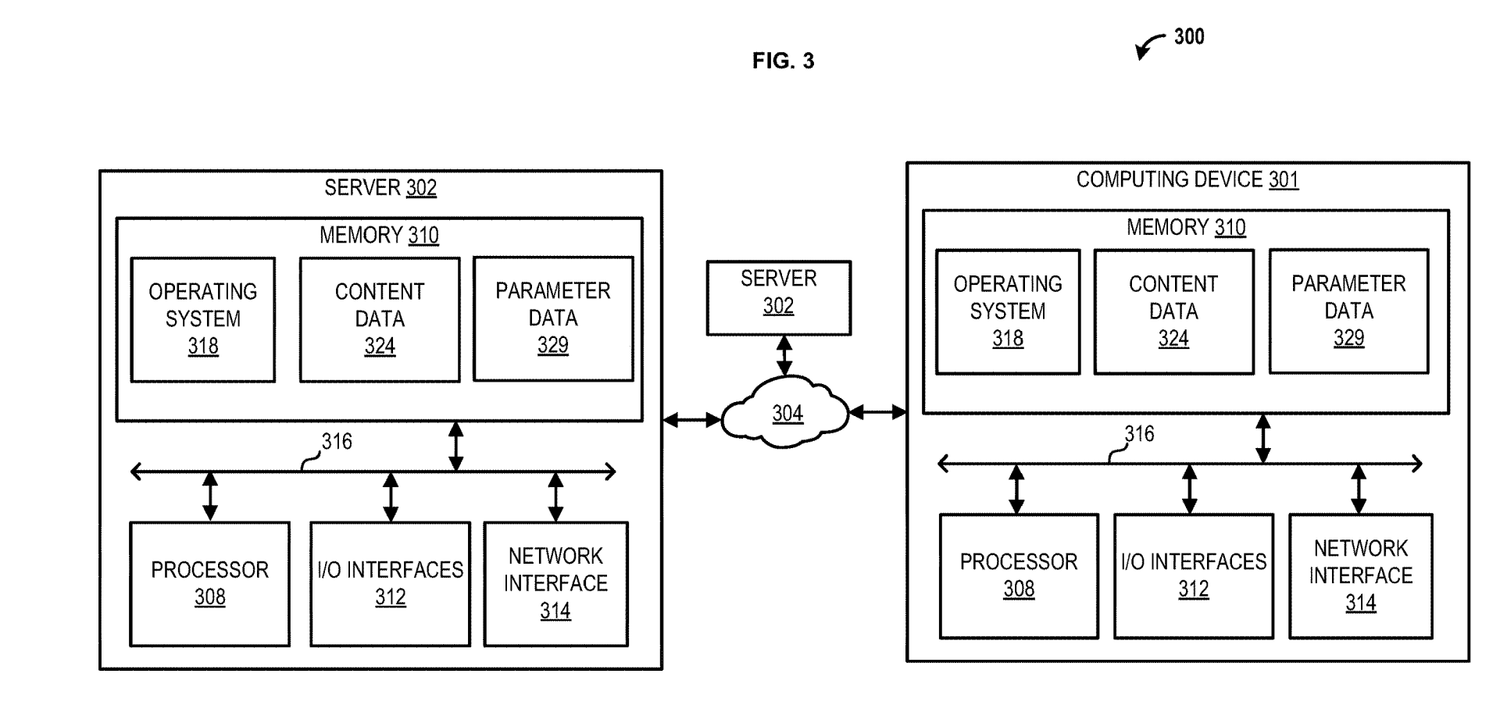
FIG. 3 shows an example system.

The present methods and systems may be computer-implemented. FIG. 3 shows a block diagram depicting a system/environment 300 comprising non-limiting examples of a computing device 301 and a server 302 connected through a network 304. Either of the computing device 301 or the server 302 may be a computing device, such as any of the devices of the system 100 shown in FIG. 1. In an aspect, some or all steps of any described method may be performed on a computing device as described herein. The computing device 301 may comprise one or multiple computers configured to store parameter data 329 (e.g., relating to prioritization parameters, prioritization schedule(s), etc.), and/or the like. The server 302 may comprise one or multiple computers configured to store content data 324 (e.g., a plurality of content segments, parameters, etc.). Multiple servers 302 may communicate with the computing device 301 via the through the network 304.

The computing device 301 and the server 302 may be a digital computer that, in terms of hardware architecture, generally includes a processor 308, system memory 310, input/output (I/O) interfaces 312, and network interfaces 314. These components (308, 310, 312, and 314) are communicatively coupled via a local interface 316. The local interface 316 may be, for example, but not limited to, one or more buses or other wired or wireless connections, as is known in the art. The local interface 316 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 308 may be a hardware device for executing software, particularly that stored in system memory 310. The processor 308 may be any custom made or commercially available processor, a central processing unit (CPU), an auxiliary processor among several processors associated with the computing device 301 and the server 302, a semiconductor-based microprocessor (in the form of a microchip or chip set), or generally any device for executing software instructions. When the computing device 301 and/or the server 302 is in operation, the processor 308 may execute software stored within the system memory 310, to communicate data to and from the system memory 310, and to generally control operations of the computing device 301 and the server 302 pursuant to the software.

The I/O interfaces 312 may be used to receive user input from, and/or for providing system output to, one or more devices or components. User input may be provided via, for example, a keyboard and/or a mouse. System output may be provided via a display device and a printer (not shown). I/O interfaces 312 may include, for example, a serial port, a parallel port, a Small Computer System Interface (SCSI), an infrared (IR) interface, a radio frequency (RF) interface, and/or a universal serial bus (USB) interface.

The network interface 314 may be used to transmit and receive from the computing device 301 and/or the server 302 on the network 304. The network interface 314 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 314 may include address, control, and/or data connections to enable appropriate communications on the network 304.

The system memory 310 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 310 may incorporate electronic, magnetic, optical, and/or other types of storage media. Note that the system memory 310 may have a distributed architecture, where various components are situated remote from one another, but may be accessed by the processor 308.

The software in system memory 310 may include one or more software programs, each of which comprises an ordered listing of executable instructions for implementing logical functions. In the example of FIG. 3, the software in the system memory 310 of the computing device 301 may comprise the parameter data 329, the content data 324, and a suitable operating system (O/S) 318. In the example of FIG. 3, the software in the system memory 310 of the server 302 may comprise the parameter data 329, the content data 324, and a suitable operating system (O/S) 318. The operating system 318 essentially controls the execution of other computer programs and provides scheduling, input-output control, file and data management, memory management, and communication control and related services.

For purposes of illustration, application programs and other executable program components such as the operating system 318 are shown herein as discrete blocks, although it is recognized that such programs and components may reside at various times in different storage components of the computing device 301 and/or the server 302. An implementation of the system/environment 300 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 4:
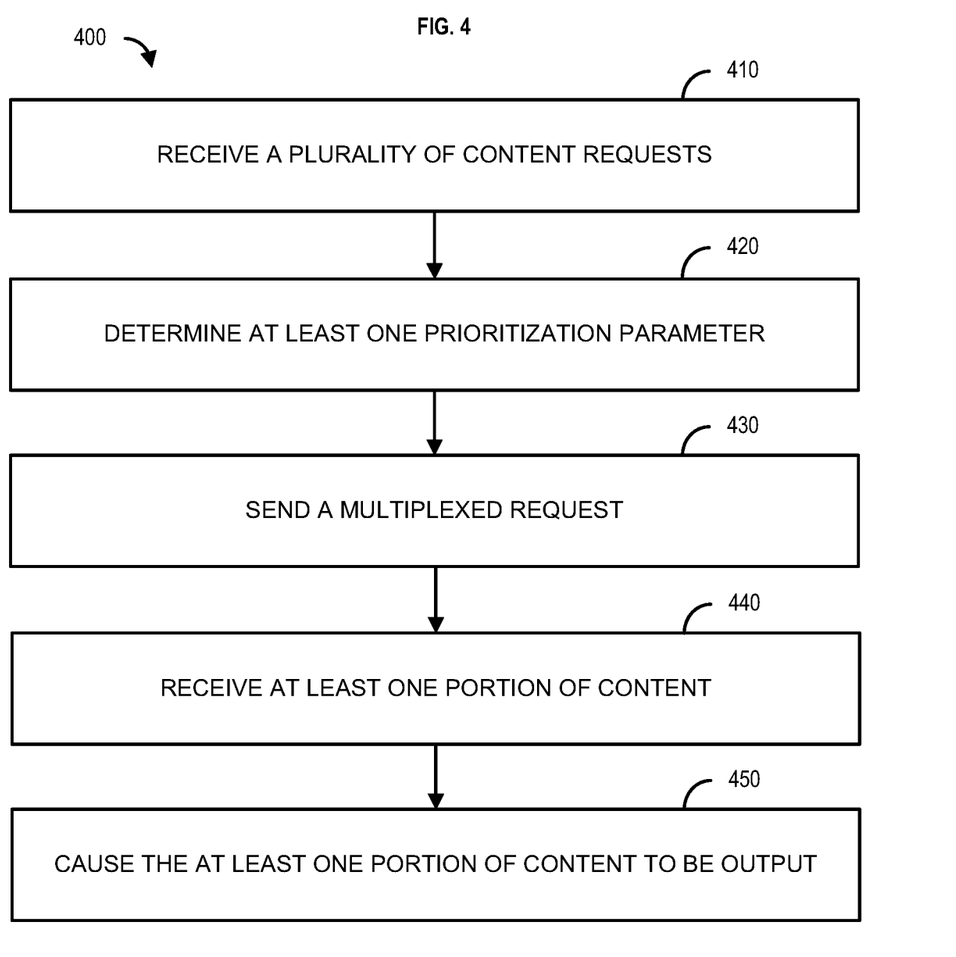
FIG. 4 shows a flowchart for an example method.

FIG. 4 shows a flowchart of an example method 400 to mitigate server-associated delays in content delivery. The method 400 may be performed in whole or in part by a single computing device, a plurality of computing devices, and the like. For example, the steps of the method 400 may be performed by the content server 108, the content server 109, and/or a computing device in communication with the content server 108 or the content server 109. Some steps of the method 400 may be performed by a first computing device (e.g., the content server 108), while other steps of the method 400 may be performed by another computing device.

At step 410, a first computing device (e.g., the content server 108) may receive a plurality of content requests. The plurality of content requests may be associated with a plurality of client devices (e.g., the user devices 112, 113). At step 420, the first computing device may determine, for each content request of the plurality of content requests, at least one prioritization parameter. For example, the first computing device may determine the at least one prioritization parameter for each content request based on (e.g., in response to) at least one portion of content associated with the corresponding content request being unavailable (e.g., due to a cache miss). The at least one prioritization parameter may comprise an urgency parameter and/or an incremental parameter.

In some examples, each content request, of the plurality of content requests, may be indicative of a buffer status associated with the client device corresponding to that content request. For example, when determining the at least one prioritization parameter for each content request of the plurality of content requests, the first computing device may determine the at least one prioritization parameter for each content request of the plurality of content requests based on the buffer status associated with the client device corresponding to the content request. The buffer status associated with a particular client device may be indicative of one or more of: a buffer length, a buffer size, an amount of time, an amount of memory, a combination thereof, and/or the like.

Additionally, or in the alternative, each content request, of the plurality of content requests, may be indicative of a content type corresponding to that content request. The content type may comprise one or more of: low-latency live streaming content, low-delay streaming content, linear content, on-demand content, high-concurrency content, high-priority content, low-priority content, a combination thereof, and/or the like. The first computing device may determine the at least one prioritization parameter for each content request of the plurality of content requests based on the content type corresponding to the content request.

Additionally, or in the alternative, each content request, of the plurality of content requests, may be indicative of a request type corresponding to that content request. For example, the first computing device may determine the at least one prioritization parameter for each content request of the plurality of content requests based on the corresponding request type. The request type may comprise one or more of: a high-priority request, a low-priority request, a manifest request, a request for at least one initialization segment, a request for at least one partial segment, a request for at least one representation associated with low-delay streaming, a request for at least one enhancement layer segment, a combination thereof, and/or the like.

At step 430, the first computing device may send a multiplexed request. The multiplexed request may be associated with the plurality of content requests. For example, the first computing device may send the multiplexed request to an upstream computing device (e.g., the content server 109 or the source 102) by sending separate requests (e.g., based on each content request received) on/via a same session or connection or stream with the upstream computing device, such as a same HTTP/2 connection/session/stream, a same HTTP/3 connection/session/stream, a same Quick UDP Internet Connection ("QUIC") connection/session/stream, and/or the like, rather than sending each content request via separate connections/sessions/streams. The upstream computing device may receive the multiplexed request inasmuch the upstream computing device may receive each of the separate content requests sent by the first computing device via the same HTTP/3 connection/session/stream, the same QUIC connection/session/stream, and/or the like, rather than via separate connections/sessions/streams. The multiplexed request may be indicative of, and/or comprise, the at least one prioritization parameter for each content request of the plurality of content requests.

At step 440, the first computing device may receive the at least one portion of content for each content request of the plurality of content requests. The first computing device may receive the at least one portion of content for each content request of the plurality of content requests from the upstream computing device. The upstream computing device may determine a prioritization schedule associated with the plurality of content requests. For example, the upstream computing device may determine the prioritization schedule based on the multiplexed request and the at least one prioritization parameter for each content request of the plurality of content requests. The upstream computing device may send a plurality of responses to the first computing device based on the prioritization schedule. Each response of the plurality of responses may comprise the at least one portion of content for at least one content request of the plurality of content requests. At step 450, the first computing device may cause the at least one portion of content associated with the content request corresponding to the client device to be output.

Figure 5:
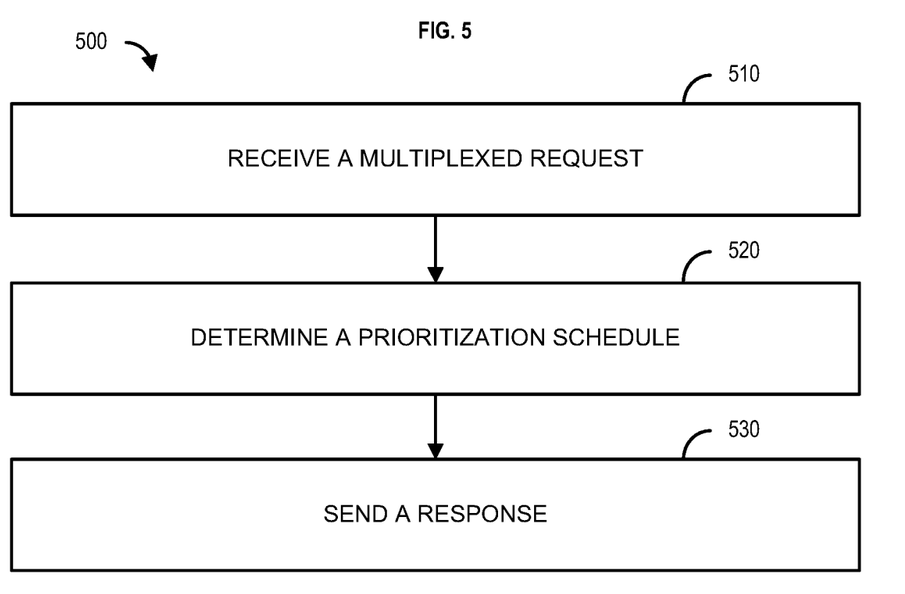
FIG. 5 shows a flowchart for an example method.

FIG. 5 shows a flowchart of an example method 500 to mitigate server-associated delays in content delivery. The method 500 may be performed in whole or in part by a single computing device, a plurality of computing devices, and the like. For example, the steps of the method 500 may be performed by the content server 108, the content server 109, and/or a computing device in communication with the content server 108 or the content server 109. Some steps of the method 500 may be performed by a first computing device (e.g., the content server 108), while other steps of the method 500 may be performed by another computing device.

At step 510, a first computing device (e.g., the content server 109) may receive a multiplexed request associated with a plurality of content requests. The plurality of content requests may each be associated with at least one portion of content. The first computing device may be located "upstream" of a downstream computing device (e.g., a content server at the edge) closest to a plurality of client devices associated with the multiplexed request. The plurality of client devices may each send a content request to the downstream computing device, and the downstream computing device may send the multiplexed request to the first computing device by sending separate requests (e.g., based on each content request received) on/via a same session or connection or stream with the first computing device, such as a same HTTP/2 connection/session/stream, a same HTTP/3 connection/session/stream, a same Quick UDP Internet Connection ("QUIC") connection/session/stream, and/or the like, rather than sending each content request via separate connections/sessions/streams. The first computing device may receive the multiplexed request inasmuch the first computing device may receive each of the separate content requests sent by the downstream computing device via the same HTTP/3 connection/session/stream, the same QUIC connection/session/stream, and/or the like, rather than via separate connections/sessions/streams.

The downstream computing device may send the multiplexed request to the first computing device due to (e.g., responsive to) a cache miss(es) associated with the requested content. For example, the downstream computing device may receive the plurality of content requests, and, for each content request of the plurality of content requests, the downstream device may determine that the at least one portion of content associated with the content request is unavailable at the downstream device. The multiplexed request may be indicative of, and/or comprise, for each content request of the plurality of content requests, at least one prioritization parameter. The at least one prioritization parameter, for each content request of the plurality of content requests, may comprise an urgency parameter or an incremental parameter. And the multiplexed request may be indicative of, and/or comprise, the urgency parameter or the incremental parameter for each content request of the plurality of content requests.

Each content request of the plurality of content requests may indicate a buffer status associated with the client device. Additionally, or in the alternative, each content request may indicate a request type and/or a content type. The buffer status may be indicative of one or more of: a buffer length, a buffer size, an amount of time, an amount of memory, a combination thereof, and/or the like. The content type may comprise one or more of: low-latency live streaming content, low-delay streaming content, linear content, on-demand content, high-concurrency content, high-priority content, low-priority content, a combination thereof, and/or the like. The request type may comprise one or more of: a high-priority request, a low-priority request, a manifest request, a request for at least one initialization segment, a request for at least one partial segment, a request for at least one representation associated with low-delay streaming, a request for at least one enhancement layer segment, a combination thereof, and/or the like.

At step 520, the first computing device may determine a prioritization schedule associated with the plurality of content requests. The first computing device may determine the prioritization schedule based on the at least one prioritization parameter for each content request of the plurality of content requests. The prioritization schedule may indicate, for each content request of the plurality of content requests, at least one of: a time or an order associated with sending the response to the downstream computing device. In some examples, based on at least one portion of content associated with the content request, at least one modification to the prioritization schedule may be determined. The at least one modification may be associated with a time or an order associated with sending at least one response associated with the at least one portion of content to the downstream computing device.

At step 530, the first computing device may send a response, for each content request of the plurality of content requests, to the downstream computing device. Sending the responses to the downstream computing device may be based on the prioritization schedule. The responses may cause the at least one portion of content associated with the content request to be output at corresponding client devices associated with the plurality of content requests. Each response to each content request may comprise at least one portion of: a frame, a chunk, a segment, a manifest file, a representation element associated the at least one portion of content associated with the content request, a combination thereof, and/or the like.

Figure 6:
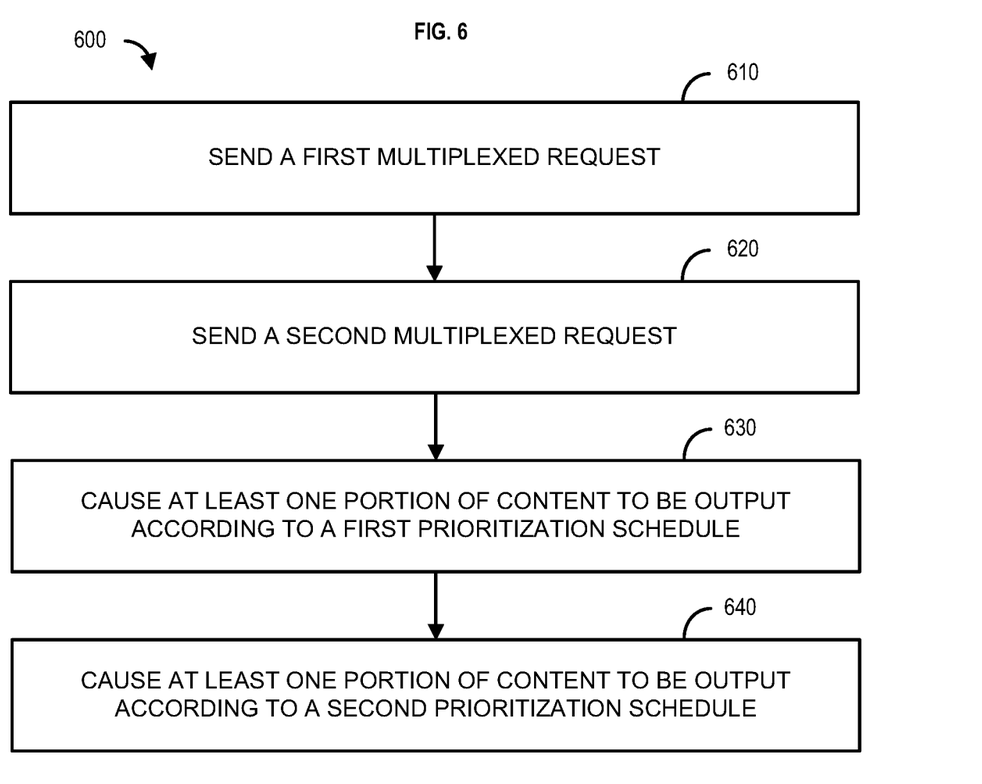
FIG. 6 shows a flowchart for an example method.

FIG. 6 shows a flowchart of an example method 600 to mitigate server-associated delays in content delivery. The method 600 may be performed in whole or in part by a single computing device, a plurality of computing devices, and the like. For example, the steps of the method 600 may be performed by the content server 108, the content server 109, and/or a computing device in communication with the content server 108 or the content server 109. Some steps of the method 600 may be performed by a first computing device (e.g., the content server 108), while other steps of the method 600 may be performed by another computing device.

A first computing device (e.g., the content server 108) may receive a plurality of content requests. Each content request of the plurality of content requests may indicate a buffer status associated with the client device. Additionally, or in the alternative, each content request may indicate a request type and/or a content type. The buffer status may be indicative of one or more of: a buffer length, a buffer size, an amount of time, an amount of memory, a combination thereof, and/or the like. The content type may comprise one or more of: low-latency live streaming content, low-delay streaming content, linear content, on-demand content, high-concurrency content, high-priority content, low-priority content, a combination thereof, and/or the like. The request type may comprise one or more of: a high-priority request, a low-priority request, a manifest request, a request for at least one initialization segment, a request for at least one partial segment, a request for at least one representation associated with low-delay streaming, a request for at least one enhancement layer segment, a combination thereof, and/or the like.

At step 610, the first computing device may send a first multiplexed request. For example, the first computing device may send the first multiplexed request to a first upstream computing device (e.g., the content server 109). The first multiplex request may be associated with a subset of a plurality of content requests. The first multiplexed request may be indicative of, and/or comprise, at least one prioritization parameter for each content request of the subset. For each content request of the subset, the first computing device may determine, based on the at least one portion of content associated with the content request being unavailable, the at least one prioritization parameter.

At step 620, the first computing device may send a second multiplexed request. For example, the first computing device may send the second multiplexed request to a second upstream computing device (e.g., a content server upstream relative to the content server 108 and/or 109). The second multiplex request may be associated with a remainder of the plurality of content requests. The second multiplexed request may be indicative of, and/or comprise, at least one prioritization parameter for each content request of the remainder. For each content request of the remainder, the first computing device may determine, based on the at least one portion of content associated with the content request being unavailable, the at least one prioritization parameter.

At step 630, the first computing device may cause at least one portion of content for each content request of the subset to be output. For example, the first computing device may cause the at least one portion of content for each content request of the subset to be output according to a first prioritization schedule. The first prioritization schedule may be based on the at least one prioritization parameter for each content request of the subset.

At step 640, the first computing device may cause, based on at least one portion of content for each content request of the remainder received via the second upstream computing device according to a second prioritization schedule, the at least one portion of content for each content request of the subset to be output by a remainder of the plurality of client devices. The second prioritization schedule may be based on the at least one prioritization parameter for each content request of the remainder.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   receiving, by a first computing device, a plurality of content requests associated with a plurality of client devices;
   for each content request of the plurality of content requests, determining, based on at least one portion of content associated with the content request being unavailable, at least one prioritization parameter associated with the content request;
   sending, to a second computing device, a multiplexed request associated with the plurality of content requests, wherein the second computing device determines a prioritization schedule based on the multiplexed request, and wherein the multiplexed request comprises the at least one prioritization parameter for each content request of the plurality of content requests;

receiving, from the second computing device based on the prioritization schedule, the at least one portion of content for each content request of the plurality of content requests; and for each client device of the plurality of client devices, causing the at least one portion of content associated with the content request corresponding to the client device to be output.

2. The method of claim 1, wherein the at least one prioritization parameter associated with each content request, of the plurality of content requests, is based on one or more of: a buffer length, a buffer size, an amount of time, or an amount of memory associated with a buffer of the client device corresponding to that content request.

3. The method of claim 1, wherein the at least one prioritization parameter associated with each content request, of the plurality of content requests, is based on a content type corresponding to that content request, and wherein the content type comprises one or more of: low-latency live streaming content, low-delay streaming content, linear content, on-demand content, high-concurrency content, high-priority content, or low-priority content.

4. The method of claim 1, wherein the at least one prioritization parameter associated with each content request, of the plurality of content requests, is based on a request type corresponding to that content request, and wherein the request type comprises one or more of: a high-priority request, a low-priority request, a manifest request, a request for at least one initialization segment, a request for at least one partial segment, a request for at least one representation associated with low-delay streaming, or a request for at least one enhancement layer segment.

5. The method of claim 1, wherein receiving, from the second computing device, the at least one portion of content for each content request of the plurality of content requests comprises:

determining, by the second computing device, based on the multiplexed request and the at least one prioritization parameter for each content request of the plurality of content requests, the prioritization schedule; and sending, based on the prioritization schedule, a plurality of responses to the first computing device.

6. The method of claim 5, wherein at least one of:

the second computing device responds to each content request, of the plurality of content requests, based on the multiplexed request and the prioritization schedule; or each response of the plurality of responses comprises the at least one portion of content.

7. The method of claim 1, wherein the at least one prioritization parameter comprises an urgency parameter or an incremental parameter, and wherein the multiplexed request comprises the urgency parameter or the incremental parameter for each content request of the plurality of content requests.

8. A method comprising:

receiving, from a first computing device, a multiplexed request associated with a plurality of content requests, wherein the multiplexed request comprises, for each content request of the plurality of content requests, at least one prioritization parameter, and wherein the plurality of content requests are each associated with at least one portion of content;

determining, based on the at least one prioritization parameter for each content request of the plurality of content requests, a prioritization schedule associated with the plurality of content requests; and for each content request of the plurality of content requests, and based on the prioritization schedule, sending a response to the first computing device, wherein the response causes the at least one portion of content associated with the content request to be output.

9. The method of claim 8, wherein the prioritization schedule indicates, for each content request of the plurality of content requests, at least one of: a time or an order associated with sending the response to the first computing device.

10. The method of claim 8, wherein the response for each content request, of the plurality of content requests, comprises at least one portion of: a frame, a chunk, a segment, a manifest file, or a representation element associated the at least one portion of content associated with the content request.

11. The method of claim 8, wherein receiving the multiplexed request comprises:

receiving, by the first computing device, the plurality of content requests; and for each content request of the plurality of content requests, determining, by the first computing device, that the at least one portion of content associated with the content request is unavailable.

12. The method of claim 8, further comprising determining, for a first content request of the plurality of content requests, and based on at least one portion of content associated with the first content request, at least one modification to the prioritization schedule, wherein the at least one modification is associated with a time or an order associated with sending the response associated with the at least one portion of content to the first computing device.

13. The method of claim 8, wherein the at least one prioritization parameter, for each content request of the plurality of content requests, comprises an urgency parameter or an incremental parameter, and wherein the multiplexed request comprises the urgency parameter or the incremental parameter for each content request of the plurality of content requests.

14. The method of claim 8, wherein:

each content request, of the plurality of content requests, is indicative of at least one of: a buffer status associated with the first computing device, a request type, or a content type associated with the at least one portion of content;

the buffer status is indicative of one or more of: a buffer length, a buffer size, an amount of time, or an amount of memory;

the content type comprises one or more of: low-latency live streaming content, low-delay streaming content, linear content, on-demand content, high-concurrency content, high-priority content, or low-priority content; and the request type comprises one or more of: a high-priority request, a low-priority request, a manifest request, a request for at least one initialization segment, a request for at least one partial segment, a request for at least one representation associated with low-delay streaming, or a request for at least one enhancement layer segment.

15. A method comprising:

sending, to a first computing device, a first multiplexed request associated with a subset of a plurality of content requests, wherein the first multiplexed request comprises at least one prioritization parameter for each content request of the subset;

sending, to a second computing device, a second multiplexed request associated with a remainder of the plurality of content requests, wherein the second multiplexed request comprises at least one prioritization parameter for each content request of the remainder;

causing, based on at least one portion of content for each content request of the subset received via the first computing device according to a first prioritization schedule, the at least one portion of content for each content request of the subset to be output, wherein the first prioritization schedule is based on the at least one prioritization parameter for each content request of the subset; and causing, based on at least one portion of content for each content request of the remainder received via the second computing device according to a second prioritization schedule, the at least one portion of content for each content request of the remainder to be output by a remainder of a plurality of client devices, wherein the second prioritization schedule is based on the at least one prioritization parameter for each content request of the remainder.

16. The method of claim 15, further comprising, for each content request of the subset, determining, based on the at least one portion of content associated with the content request being unavailable, the at least one prioritization parameter for the content request.

17. The method of claim 15, further comprising, for each content request of the remainder, determining, based on the at least one portion of content associated with the content request being unavailable, the at least one prioritization parameter for the content request.

18. The method of claim 15, wherein each content request, of the plurality of content requests, is indicative of one or more of: a buffer length, a buffer size, an amount of buffer time, or an amount of buffer memory associated with a client device corresponding to that content request, and wherein the at least one prioritization parameter for that content request is based on one or more of: the buffer length, the buffer size, the amount of buffer time, or the amount of buffer memory associated with the client device.

19. The method of claim 15, wherein each content request, of the plurality of content requests, is indicative of a content type corresponding to that content request, wherein the at least one prioritization parameter for that content request is based on the content type, and wherein the content type comprises one or more of: low-latency live streaming content, low-delay streaming content, linear content, on-demand content, high-concurrency content, high-priority content, or low-priority content.

20. The method of claim 15, wherein each content request, of the plurality of content requests, is indicative of a request type corresponding to that content request, wherein the at least one prioritization parameter for that content request is based on the request type, and wherein the request type comprises one or more of: a high-priority request, a low-priority request, a manifest request, a request for at least one initialization segment, a request for at least one partial segment, a request for at least one representation associated with low-delay streaming, or a request for at least one enhancement layer segment.

* * * * *